(12) United States Patent
Vasshus et al.

(10) Patent No.: US 9,358,483 B2
(45) Date of Patent: Jun. 7, 2016

(54) SIEVE CLOTH AND METHOD OF USING SAME

(75) Inventors: Jan Kristian Vasshus, Sandnes (NO); Arne Malmin, Kleppe (NO)

(73) Assignee: Cubility AS, Sandnes (NO)

( * ) Notice: Subject to any disclaimer, the term of this patent is extended or adjusted under 35 U.S.C. 154(b) by 279 days.

(21) Appl. No.: 14/129,571

(22) PCT Filed: Jun. 28, 2012

(86) PCT No.: PCT/NO2012/050123
§ 371 (c)(1),
(2), (4) Date: Dec. 27, 2013

(87) PCT Pub. No.: WO2013/002646
PCT Pub. Date: Jan. 3, 2013

(65) Prior Publication Data
US 2014/0131114 A1   May 15, 2014

Related U.S. Application Data

(60) Provisional application No. 61/503,011, filed on Jun. 30, 2011.

(30) Foreign Application Priority Data

Jun. 29, 2011   (NO) .................................... 20110938

(51) Int. Cl.
| | |
|---|---|
| *E21B 21/06* | (2006.01) |
| *B01D 33/056* | (2006.01) |
| *B01D 33/41* | (2006.01) |

(Continued)

(52) U.S. Cl.
CPC ................ *B01D 33/41* (2013.01); *B01D 29/09* (2013.01); *B01D 33/04* (2013.01); *B01D 33/056* (2013.01); *B07B 1/10* (2013.01); *B07B 1/46* (2013.01); *B07B 1/4645* (2013.01); *B07B 13/18* (2013.01);

(Continued)

(58) Field of Classification Search
CPC ....... E21B 21/01; E21B 21/06; E21B 21/063; E21B 21/065; B01D 29/00; B01D 33/056; B01D 33/41; B01D 33/00; B07B 1/46; B07B 1/4609
See application file for complete search history.

(56) References Cited

U.S. PATENT DOCUMENTS

| 2,220,985 A | 10/1938 | Wilson |
| 5,003,731 A | 4/1991 | Durr |

(Continued)

FOREIGN PATENT DOCUMENTS

| GB | 876879 | 9/1961 |
| KR | 20110064873 | 6/2011 |
| WO | 00/67921 | 11/2000 |

*Primary Examiner* — Catherine Loikith
(74) *Attorney, Agent, or Firm* — Gable Gotwals (57) ABSTRACT

This invention relates to a sieve cloth and a method of connecting the sieve cloth to a sieve apparatus having an endless sieve cloth supported by a support belt which, in operation, is structured to rotate around at least two spaced-apart turning rollers. The method includes the steps of providing at least one sieve cloth sheet having an upper side, a lower side, two side portions and a first end portion and a second end portion extending between the side portions; bringing at least a portion of the sieve cloth sheet into engagement with a portion of the support belt; positioning the sieve cloth sheet against the support belt by moving the support belt around the turning rollers; bringing at least two adjoining end portions into engagement with each other until the at least one sieve cloth sheet forms an endless sieve cloth.

25 Claims, 9 Drawing Sheets

(51) Int. Cl.
*B07B 1/46* (2006.01)
*B01D 29/09* (2006.01)
*B07B 1/10* (2006.01)
*B01D 33/04* (2006.01)
*B07B 13/18* (2006.01)

(52) U.S. Cl.
CPC ......... *E21B 21/065* (2013.01); *B01D 2201/188* (2013.01); *Y10T 29/49826* (2015.01)

(56) References Cited

U.S. PATENT DOCUMENTS

| | | | |
|---|---|---|---|
| 5,887,729 | A | 3/1999 | Sugiyama |
| 2003/0042179 | A1* | 3/2003 | Adams ................ B01D 29/012 209/408 |
| 2008/0223760 | A1 | 9/2008 | Vasshus |

\* cited by examiner

SIEVE CLOTH AND METHOD OF USING SAME

CROSS-REFERENCE TO RELATED APPLICATIONS

This United States National Phase of PCT Application No. PCT/NO2012/050123 filed 28 Jun. 2012, claims priority to Norwegian Patent Application No. 20110938 filed 29 Jun. 2011 and to U.S. Patent Application No. 61/503,011 filed 30 Jun. 2011, each of which are incorporated herein by reference.

BACKGROUND OF THE INVENTION

The present invention concerns a sieve cloth for operation in a sieve apparatus. More particularly, it concerns a sieve cloth for operation in a sieve apparatus in order to separate solid particles from a fluid, wherein the sieve apparatus is of a type provided with an endless sieve cloth structured in a manner allowing it to be moved around two spaced-apart turning rollers, about a method of connecting the sieve cloth to the sieve apparatus, and about a method of using the sieve apparatus.

The present invention is especially directed towards recovery of drilling mud which, together with drill cuttings, are brought up to a surface in context of drilling petroleum wells. It should be appreciated, however, that the invention also may be used for the purpose of separating fluids from solid particles other than drill cuttings.

Separation of solid particles from fluid flows by virtue of passing a fluid through a filtering- or sieving device having perforations of such a size that the solid particles are retained on the sieve surface instead of passing through it, represents well-known technology.

The present applicant has developed and put into production a sieve apparatus being sold under the trademark Mud-Cube®. The sieve apparatus is based on an endless sieve cloth which, in operation, rotates around two spaced-apart turning rollers. A sieve apparatus of the endless sieve cloth type has proven to exhibit several advantages with respect to stationary sieve cloths being used in a vibratory sieve apparatus or a so-called "shale-shaker". The advantages relate to, among other things, environmental, economic and capacity-related conditions as set forth in applicant's patent NO 323519.

The applicant describes, in his patent NO 325804, an apparatus and a method for guiding the movement of at least one endless sieve cloth which is structured in a manner allowing it to be moved around at least two spaced-apart turning rollers. The movement is guided by virtue of two or more portions of the sieve cloth being in engagement with at least one guiding device extending between the turning rollers of the sieve apparatus, and in such a manner that at least portions of the sieve cloth essentially are prevented from being able to move relative to the guiding device in a direction perpendicular to the direction of rotation of the sieve cloth. In one embodiment according to said NO 325804, the guiding device involves fixing the sieve cloth to a support belt which provides support to the sieve cloth between the turning rollers.

It has turned out, however, that a sieve cloth being attached to an underlying support belt is subject to undesirable loads capable of reducing the effective life of the cloth and, moreover, that it is relatively time-consuming to attach the sieve cloth to the guiding device. Among other things, the undesirable loads are due to the sieve cloth, which is disposed on the outside of the support belt, being forced to move at the same velocity as the support belt which is stretched between the turning rollers, despite the path of motion of the sieve cloth being longer than the path of motion of the support belt. Also, the applicant has carried out tests in which several individual cloths were fixed in series onto the support belt, however without observing improvements with respect to the above-mentioned disadvantages.

Accordingly, there is a need for a device and a method of connecting a sieve cloth capable of moving at a different velocity than that of an underlying support belt structured in a manner allowing it to support the sieve cloth between at least two spaced-apart turning rollers. Further, there is a need for providing a simple and fast way of connecting or removing the sieve cloth to/from the apparatus.

The object of the invention is to remedy or to reduce at least one of the disadvantages of the prior art, or at least to provide a useful alternative to the prior art.

The object is achieved by virtue of features disclosed in the following description and in the subsequent claims.

According to a first aspect of the present invention, a method of connecting a sieve cloth to a sieve apparatus of a type wherein an endless sieve cloth is supported by a support belt which, in operation, is structured in a manner allowing it to rotate around at least two spaced-apart turning rollers is provided, wherein the method comprises the steps of:
 providing at least one sheet of sieve cloth having an upper side, a lower side, two side portions and a first and a second end portion extending between the side portions;
 bringing at least a portion of the sieve cloth into engagement with the support belt;
 positioning the sieve cloth against the support belt by rotating the support belt; and
 bringing at least two adjoining end portions into engagement with each other until the at least one sheet of sieve cloth forms an endless sieve cloth.

Advantageously, the sieve cloth is released from engagement with the support belt, whereby the sieve cloth is allowed to rotate around the turning rollers at a different velocity than that of the support belt.

In one embodiment, the at least one sheet of sieve cloth extends across the entire width of the sieve apparatus, i.e. across most of the extent in the longitudinal direction of the turning rollers. In another embodiment, two or more sheets of sieve cloth are disposed in parallel. Advantageously, the two or more sheets of sieve cloth disposed in parallel are brought into engagement with each other in the adjoining side portions of the sheets. Said adjoining side portions may, but do not have to, extend parallel to the direction of movement of the sieve cloth.

In one embodiment, the end portions of at least one of the at least one sieve cloth sheet may be provided with a cloth attachment means at both the lower side and the upper side of the sieve cloth sheet. The effect thereof is that two or more sieve cloth layers may be disposed in layers, whereby the filtering characteristic and/or the effective life properties of the sieve cloth sheet may be changed.

The step of releasing the sieve cloth from engagement with the support belt may be an active step carried out by, for example, an operator. Alternatively, it may be a step occurring upon providing a relatively weak engagement between the sieve cloth and the support belt, and in such a manner that the engagement is broken by "shear stresses" arising when at least one of the turning rollers is set into rotation by means of a driving device, whereby the support belt and the endless sieve cloth disposed thereon are moved, however at a dissimilar velocity, as explained above.

Engagement between the sieve cloth and the support belt may be provided by means of an attachment means releasably connected to a portion of the support belt. The advantageous effect thereof is that the attachment means is connected to a desirable portion of the support belt without requiring the support belt to move, as would be the case if the attachment means was fixedly connected to the support belt. Another advantageous effect thereof may be that the attachment means may be removed from the support belt once the sieve cloth has been "threaded onto" the support belt. This, however, requires an active step on behalf of an operator.

In order to facilitate control of the apparatus, and especially remote control of the apparatus to reduce the risk of damage to operators, among other things, the method may further comprise connecting at least one first signal transmitter to a portion of the support belt; putting the at least one first signal transmitter into communication with a receiver connected to a control system, wherein the control system is structured to control a driving device providing rotation of the support belt, and in such a manner that the driving device is brought to a stop when the first signal transmitter is located in a predetermined position in the sieve apparatus.

The advantageous effect thereof is, among other things, that e.g. an attachment means fixedly connected to the support belt may be brought to a stop when in a favourable position for attaching the sieve cloth sheet in context of mounting thereof.

For example, the signal transmitter may be of a type described in applicant's Norwegian patent application 20110438 and attached to the support belt by means of e.g. a clip device.

Correspondingly, the method may further comprise connecting at least one second signal transmitter to a portion of the sieve cloth, and putting the at least one second signal transmitter into communication with a receiver connected to a control system, wherein the control system is structured in a manner allowing it to control a driving device providing rotation of the support belt, and in such a manner that the interconnected end portions of the sieve cloth are brought to a stop in a predetermined position in the sieve apparatus. The control system may be, but does not have to be, the same as the above-mentioned control system which receives signals received from the receiver connected to the signal transmitter for the support belt.

For example, the effect thereof may be that the splice portion of the sieve cloth or the joining portion between two end portions may be brought to a stop when in a favourable position to the operator.

In a second aspect, a sieve apparatus for separating solid particles from a fluid is provided, wherein the sieve apparatus is of a type provided with an endless sieve cloth structured in a manner allowing it to be moved around two spaced-apart turning rollers, wherein the sieve cloth comprises at least one sieve cloth sheet, wherein each of the at least one sieve cloth sheet comprises an upper side, a lower side, two side portions and a first end portion and a second end portion extending between the side portions, wherein the end portions are provided with a first cloth attachment means disposed at least in a portion of the first end portion, and a second cloth attachment means disposed at least in a portion of the second end portion, and which fits in a complementary manner to the first cloth attachment means.

By so doing, the at least one sheet of sieve cloth may be connected to an endless sieve cloth.

In order to provide support for the sieve cloth, the sieve apparatus may further comprise a support belt structured in a manner allowing it to support the at least one sheet of sieve cloth, the support belt being disposed endlessly around the turning rollers.

The at least one sheet of sieve cloth may be provided with an engagement means structured to go into engagement with the support belt.

In its simplest form, the engagement means may be comprised of a connection means, for example a rope or a strip inserted through e.g. loops/eyes arranged in the first end portion of the sieve cloth, the rope/strip of which is connected to the support belt.

Alternatively, the support belt may be provided with a second engagement means arranged within, or connected to, a portion of the support belt, for example, but not limited to, a hook device, a clamp, or a hinge lock.

Connecting the sieve cloth sheet to the support belt has the effect of allowing the sieve cloth to be threaded or passed over most of the support belt, and in such a manner that the sheet of sieve cloth may be connected together so as to form an endless sieve cloth.

The engagement means may be comprised of one of the first cloth attachment means and the second cloth attachment means. Upon having threaded or passed the sieve cloth over most of the support belt, the engagement means may thus be used as an attachment means in order to form the endless sieve cloth.

Engagement between two adjoining end portions of the sieve cloth may be provided by means of an attachment means which, for example, is chosen from a group consisting of: a zipper; a snap lock; hook and loop fasteners; one or more magnets; a series of push buttons, or any combination thereof; or an adhesive provided by means of a gluing agent or a vulcanization. For example, said one or more magnets may be comprised of a magnet strip- or list, or of a series of magnets.

Typically, the support belt is formed from support strings extending in a cross pattern, for example, but having a larger mesh aperture than the sieve cloth it is to support.

The sieve apparatus employing a sieve cloth according to the second aspect and the associated features is very suitable for use on a drilling rig to be used in context of drilling a well for recovery of petroleum.

In a third aspect, a method of controlling separation of solid particles from a fluid is provided, wherein the separation is carried out by means of a sieve apparatus which includes an endless sieve cloth comprising at least two sieve cloth sheets having dissimilar filtering characteristics, wherein the method comprises controlling the endless sieve cloth by rotating the turning rollers in such a manner that a desirable amount of solid particles and fluid is supplied to at least one of, or is distributed between two or more of, the at least two sieve cloth sheets having desirable characteristics.

Hereinafter, an example of a preferred embodiment is described and is depicted in the accompanying drawings, where:

FIG. 9b shows, in larger scale, detail C shown in FIG. 9a.

Positional references, such as above, below, right and left, refer to the position shown in the relevant figure.

Equal or corresponding elements are denoted with the same reference numeral in the various figures.

In the figures, reference numeral 1 denotes a sieve cloth according to the present invention. The sieve cloth 1 may be comprised of one or more sheets 1' which, when operational, are connected together so as to form an endless sieve cloth 1 for use in a sieve apparatus 10 of a type wherein the sieve cloth 1 is moved around two spaced-apart turning rollers 14. Such a sieve apparatus is known from e.g. applicant's granted patent NO 323519, wherein at least one suction nozzle is disposed up against a lower side of the endless sieve cloth for provision of a fluid flow through at least a portion of the material located on the endless sieve cloth, or from NO 326594 or patent application NO 20110438.

Hereinafter, the sheet 1' of sieve cloth will also be termed a sieve cloth sheet 1'.

Figure 1:
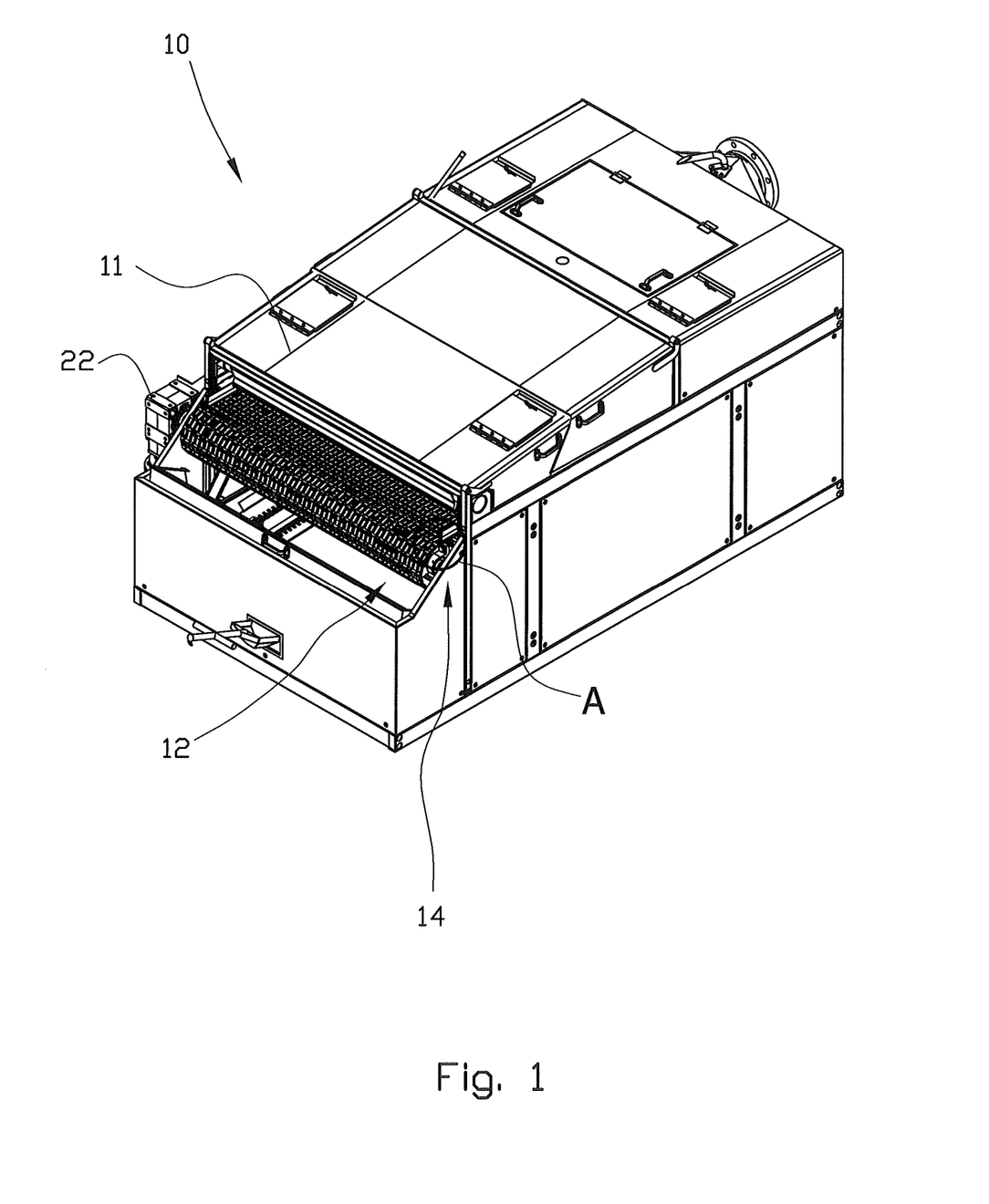
FIG. 1 shows, in perspective, a front elevation of a sieve apparatus provided with at rotating sieve device.

FIG. 1 shows a sieve apparatus 10 of a type being sold under the trademark MudCube®, wherein an endless support belt 12 is disposed around two spaced-apart turning rollers 14 (only one shown in FIG. 1). It should be appreciated that the very support belt 12 may constitute a sieve cloth 1 capable of being used for sieving of relatively coarse particles.

Figure 2:
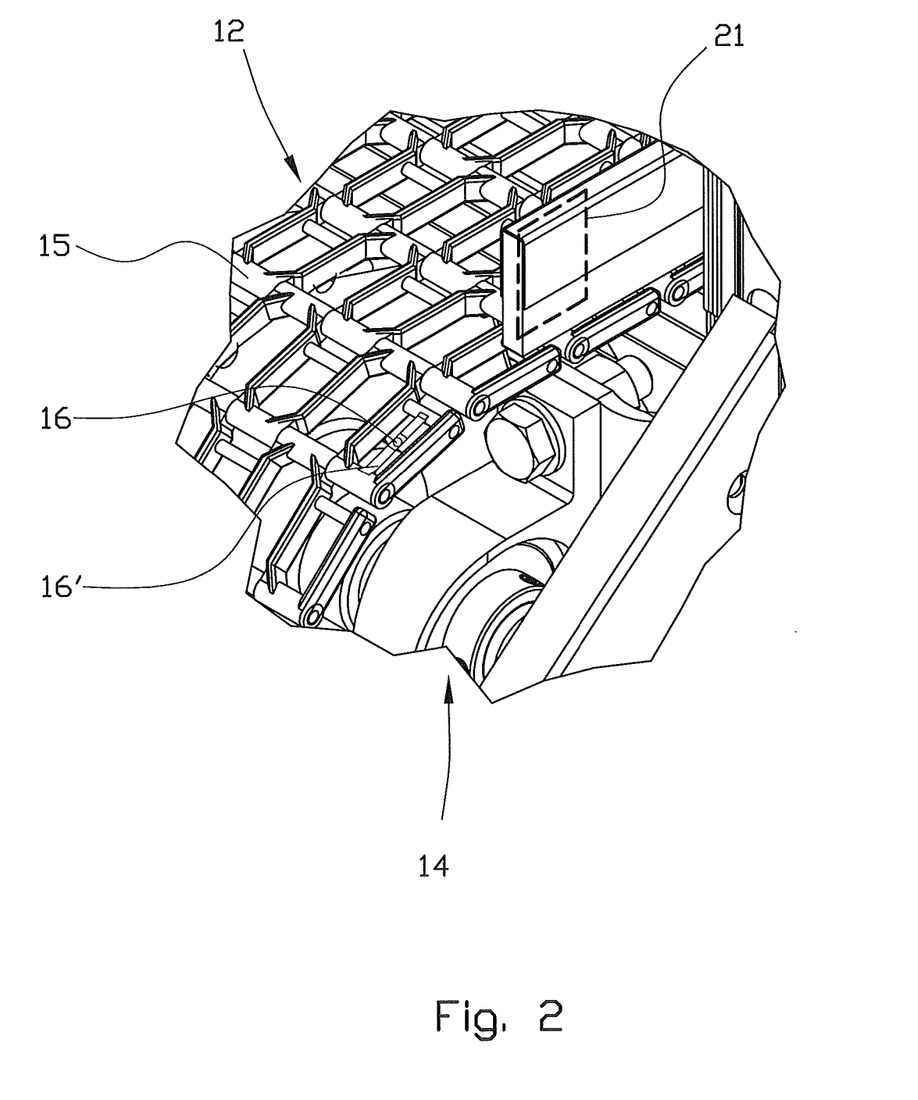
FIG. 2 shows, in larger scale and in perspective, a front elevation of detail A.

FIG. 2 shows, in larger scale, detail A as depicted in FIG. 1. An attachment means 16 is connected to a portion of the support belt 12. In the embodiment shown, the attachment means 16 is releasably connected to the support belt 12 by means of a mounting bracket 16' attached to the support belt 12 by means of a clip device. The object of the releasable mounting bracket 16' will be explained in the following.

Figure 3:
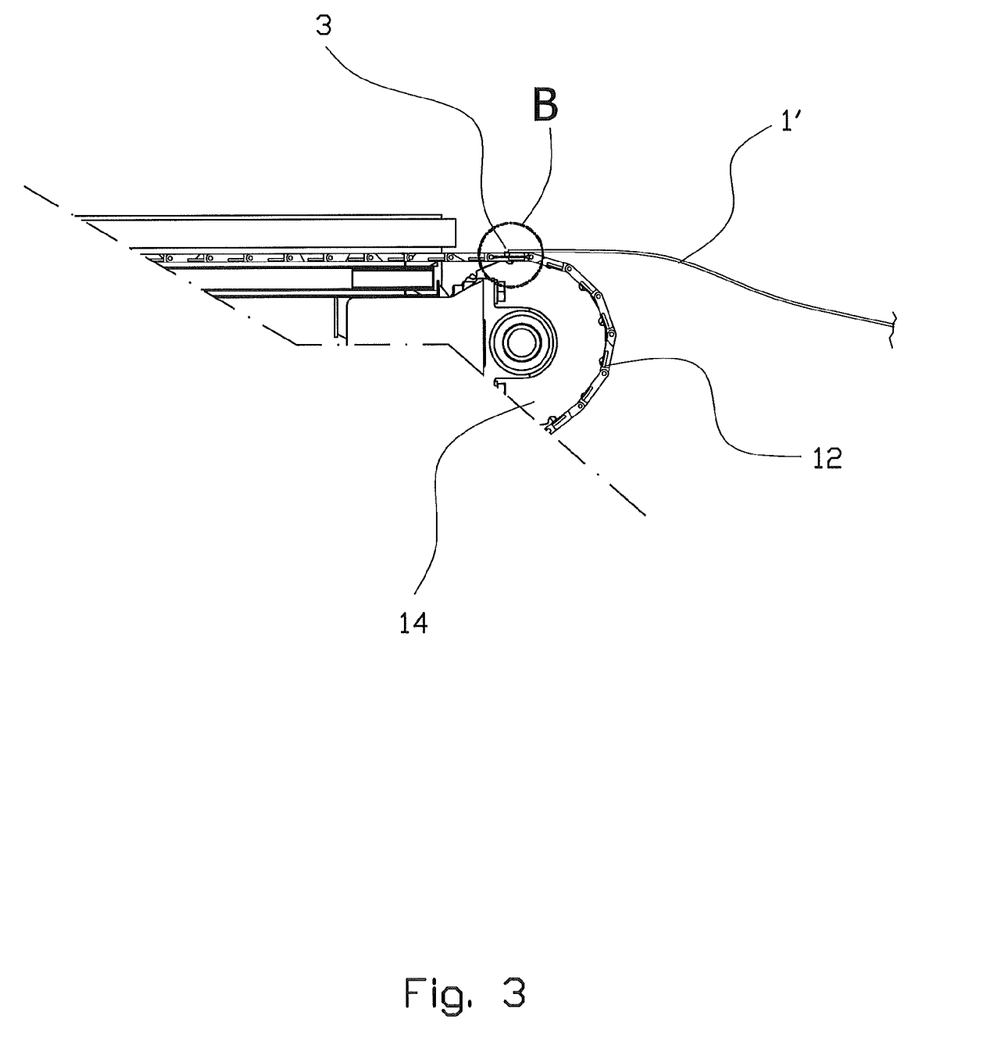
FIG. 3 shows a side view of a portion of the sieve apparatus in FIG. 1, wherein an end portion of a sheet of sieve cloth is attached to a support belt.
Figure 6:
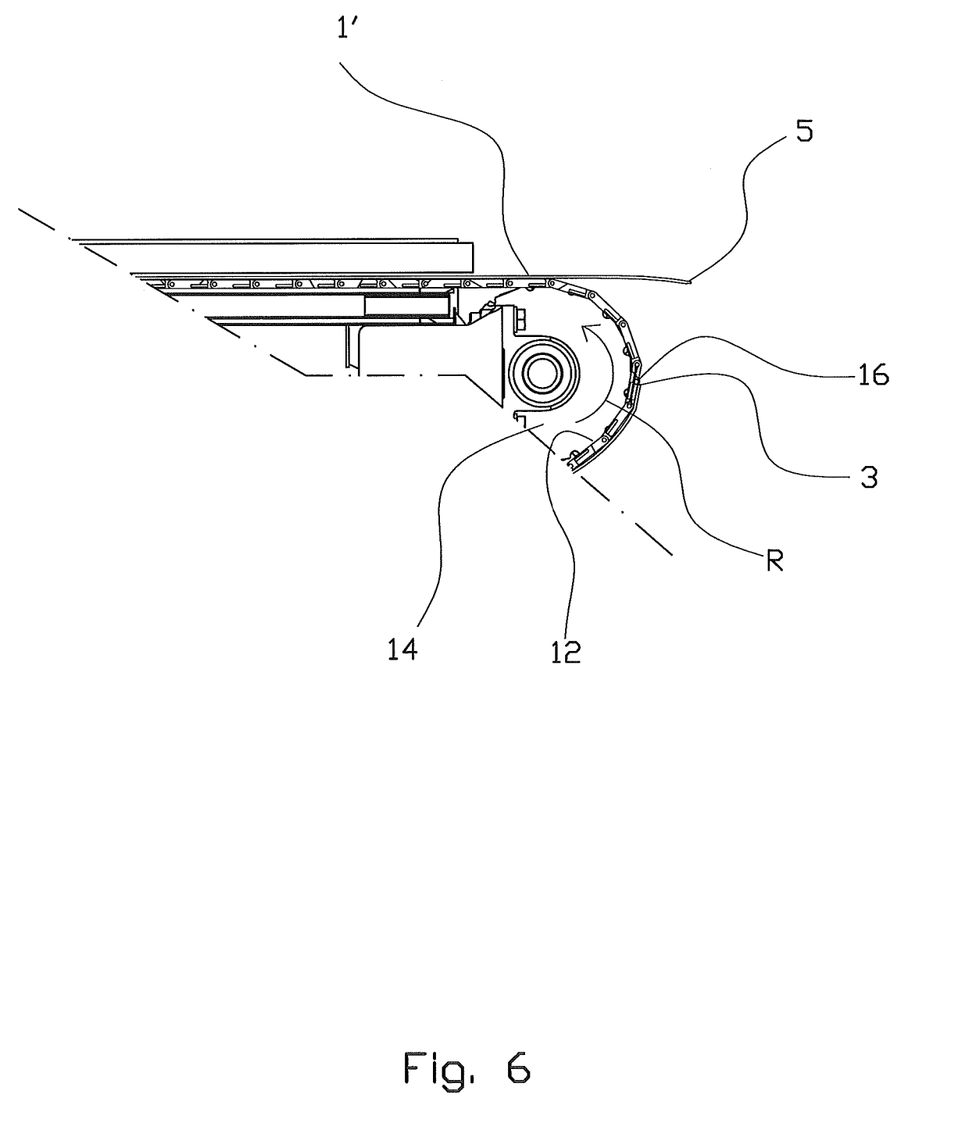
FIG. 6 shows the same as in FIG. 3, but wherein a substantial part of the sheet of sieve cloth is positioned against the support belt.
Figure 7:
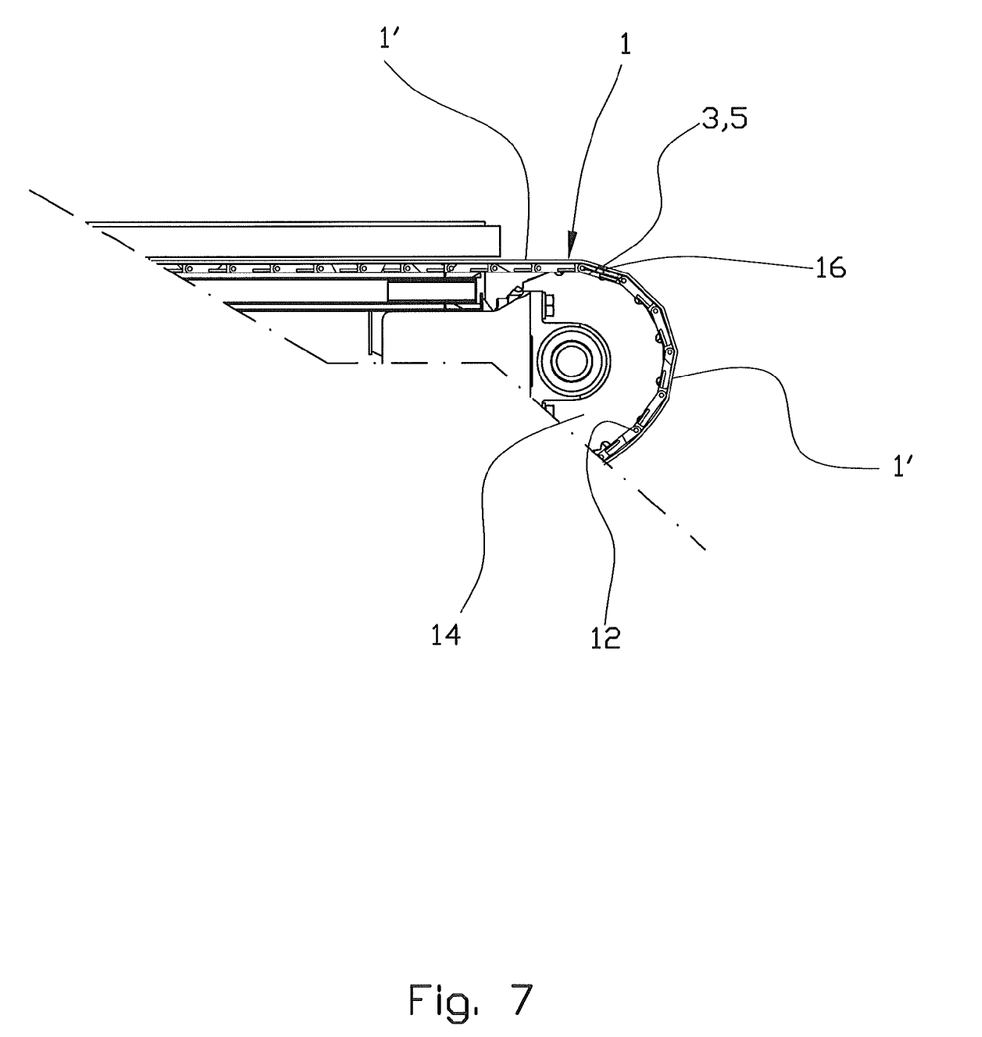
FIG. 7 shows the same as in FIG. 5, but wherein the end portions of the sheet of sieve cloth are brought into engagement with each other, whereby the sheet of sieve cloth forms an endless sieve cloth.

FIG. 3, FIG. 6 and FIG. 7 illustrate the manner in which a sieve cloth sheet 1' is introduced in the sieve apparatus 10.

In FIG. 3, a first end portion 3 of the sieve cloth sheet 1' is attached to a portion of the support belt 12 by means of an engagement means 4 brought into engagement with the attachment means 16 via an upwards projecting portion of the mounting bracket 16'. This is shown in larger scale in FIG. 4.

Figure 4:
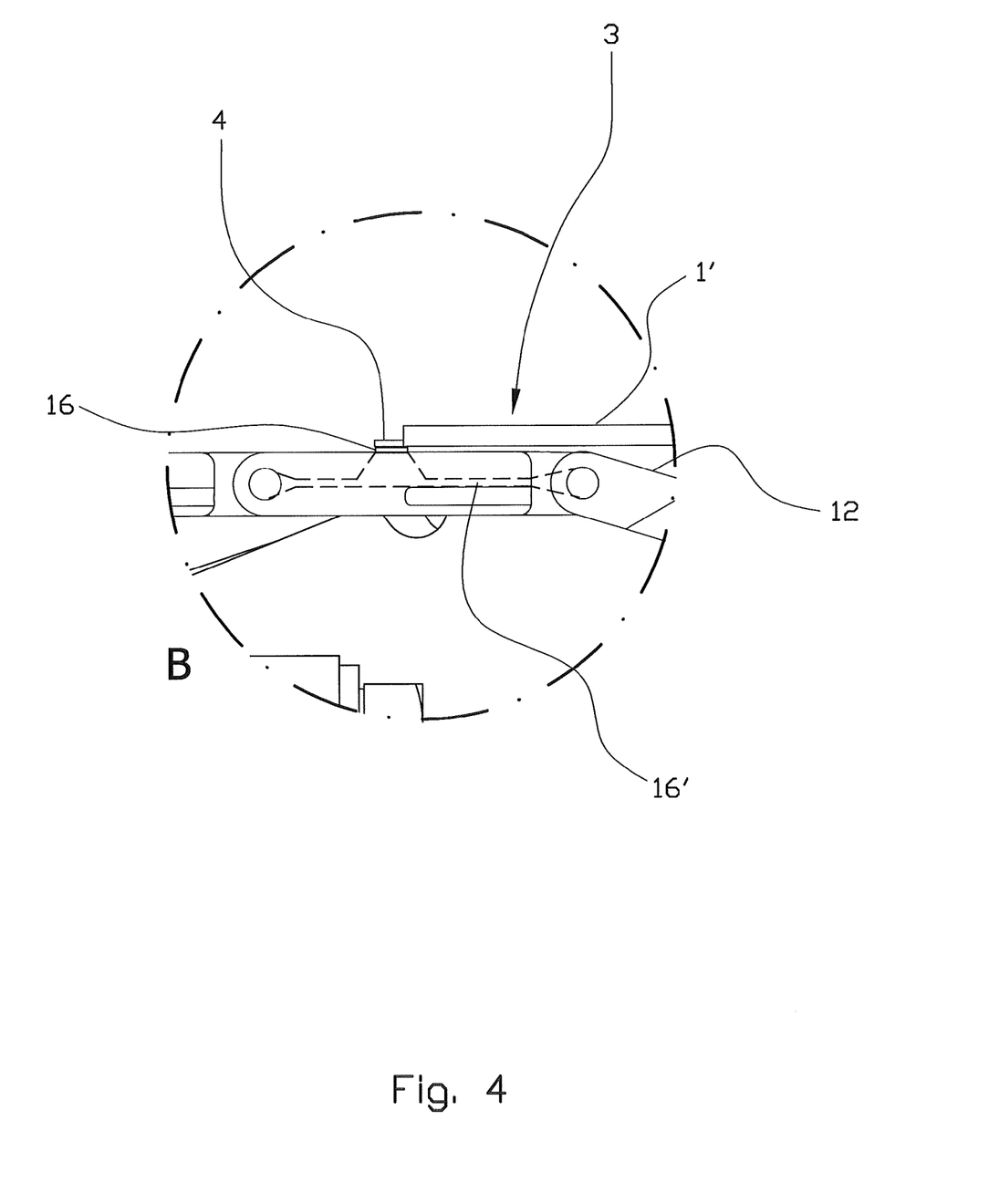
FIG. 4 shows, in larger scale, detail B of FIG. 3.

In the embodiment shown, the engagement means 4 and the attachment means 16 connected to the mounting bracket 16' are complementary and may, for example, be comprised of a so-called hook and loop fastener, a magnet, push buttons or a similar releasable attachment device. The engagement means 4 may be the same as the cloth attachment means which, for practical reasons, will be denoted with the same reference numeral as that of the first end portion 3 of the sieve cloth sheet.

One of the advantages of the releasable mounting bracket 16' is that it may be located at a desirable location in the support belt 12. For example, it will be appropriate for an operator to position the mounting bracket 16' above the turning roller 14, which is located at an access hatch 11 (shown in an open state in FIG. 1). By so doing, there is no need for moving the support belt 14 to render the attachment means 16 for the sieve cloth sheet 1' accessible.

Figure 5:
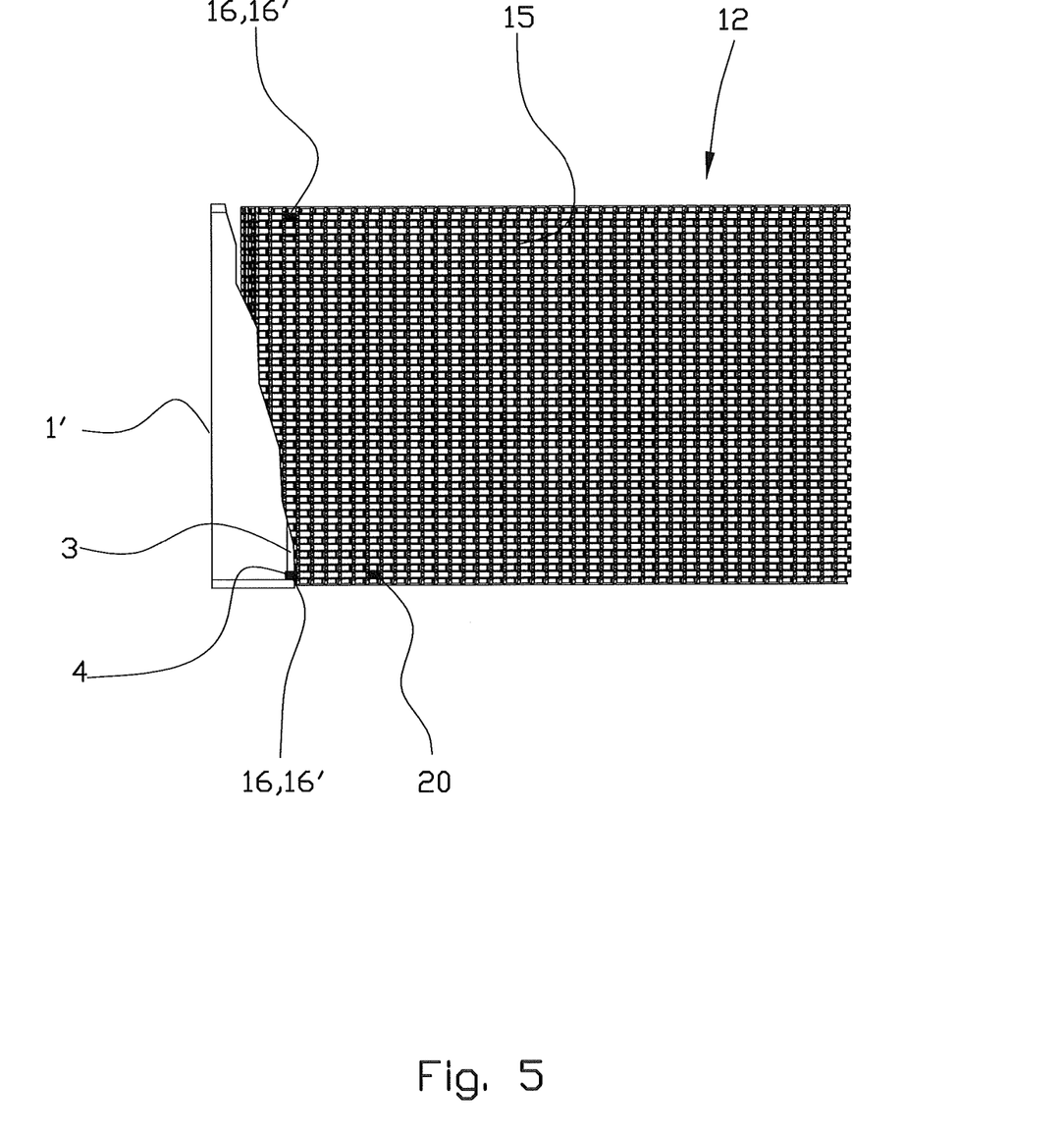
FIG. 5 shows a plane view of an endless support belt, wherein a portion of a sheet of sieve cloth is brought into engagement with the support belt, and in a manner corresponding to that shown in FIG. 3.

FIG. 5 shows a front elevation, as viewed from above, of only the support belt 12 depicted in the sieve apparatus 10 of FIG. 1. In FIG. 5, the end portion 3 of the sieve cloth sheet 1' is releasably attached to the attachment means 16, which is protruding upwards from the mounting bracket 16'. Thus, FIG. 5 shows the same as in FIG. 3, but seen from above. For the sake of clarity, a portion of the end portion 3 of the sieve cloth sheet 1' is shown in a removed state. This is shown by means of a zigzag line.

In an alternative embodiment, it should be appreciated that the attachment means 16 shown in FIG. 3 may be fixedly connected to the support belt 12. In order to facilitate a desirable positioning of the attachment means 16 in context of fastening the sieve cloth sheet 1' to the support belt 12, as shown in FIG. 3, the support belt 12 may be connected to a signal transmitter 20 (see FIG. 5) structured to communicate with a receiver 21 (see FIG. 2) connected to a control system (not shown), wherein the control system is structured in a manner allowing it to control a driving device 22 (see FIG. 1) for rotation of the turning roller 14, and in such a manner that the support belt 12 is brought to a stop in a position within which the attachment means 16 is located in a suitable position relative to e.g. the hatch 11 of the sieve apparatus 10. In FIG. 1, the hatch 11 is shown in a lowered position in a front portion of the sieve apparatus 10. The very control system, and the manner in which it controls the driving device 22, will be well known to a person skilled in the area and, for this reason, will not be described further in this document.

Even though the embodiment shown in FIG. 2 indicates that the attachment means 16 is comprised of a fastening spot, it should be appreciated that the attachment means 16 may just as well be comprised of a lengthy attachment means. Such a lengthy attachment means may be a ribbon extending, for example, parallel to the turning roller 14 extending between the side portions of the support belt 12. An attachment means of such a type may be continuous or consist of several individual elements. For example, and alternatively, transverse elements 15 may constitute an attachment means for a rope or a strip, as mentioned above.

Similar to the attachment means 16 shown in FIG. 2, a lengthy attachment means may be releasably connected to the support belt 12, for example by means of at least two mounting brackets 16'. As such, the attachment means 16 shown in FIG. 4 may be a ribbon.

FIG. 6 shows the first end portion 3 of the sieve cloth sheet 1' upon being pulled over all of the at least two turning rollers 14 in the sieve apparatus 10 and almost back to its starting position, as shown in FIG. 3. This is achieved upon setting the turning roller 14 into rotation R by means of the driving device 22 depicted in FIG. 1.

In FIG. 7, the first end portion 3 of the sieve cloth sheet 1' has been brought into engagement with a second end portion 5, and in such a manner that the sieve cloth sheet 1' constitutes an endless sieve cloth 1. The cloth attachment means used to provide the connection is, for practical reasons, denoted with the same reference numeral as that of the first end portion 3 and the second end portion 5 of the sieve cloth sheet 1'. This has been carried out in all relevant figures.

In the embodiment shown in FIG. 3, FIG. 6 and FIG. 7, it is evident that the sieve cloth sheet 1' is comprised of one piece. However, two or more sieve cloth sheets 1' may be attached to each other in series, as shown in FIGS. 8a, 8b and 9a.

Figure 8A:
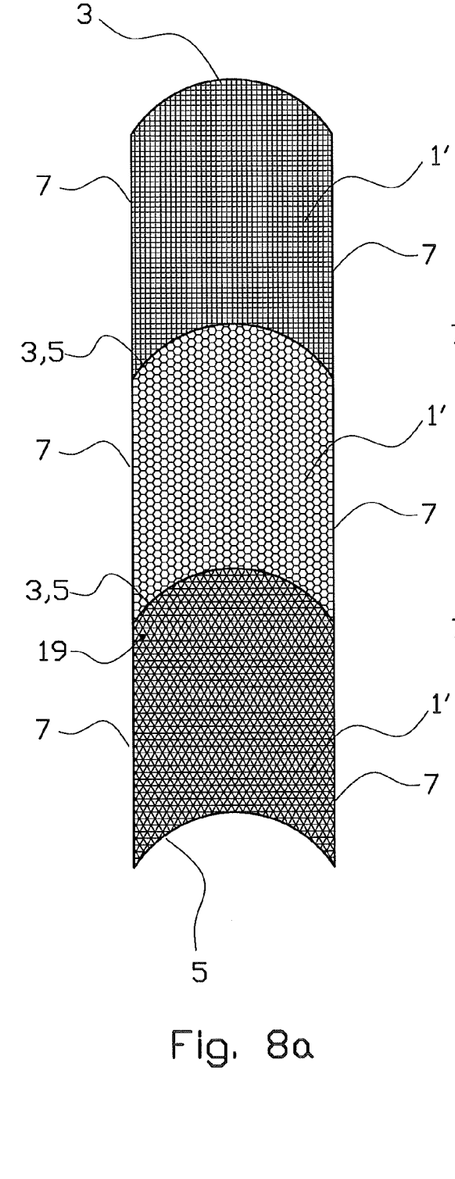
FIGS. 8a-8b show plane views of three and two sheets, respectively, of sieve cloths brought into engagement with each other in a series.
Figure 9A:
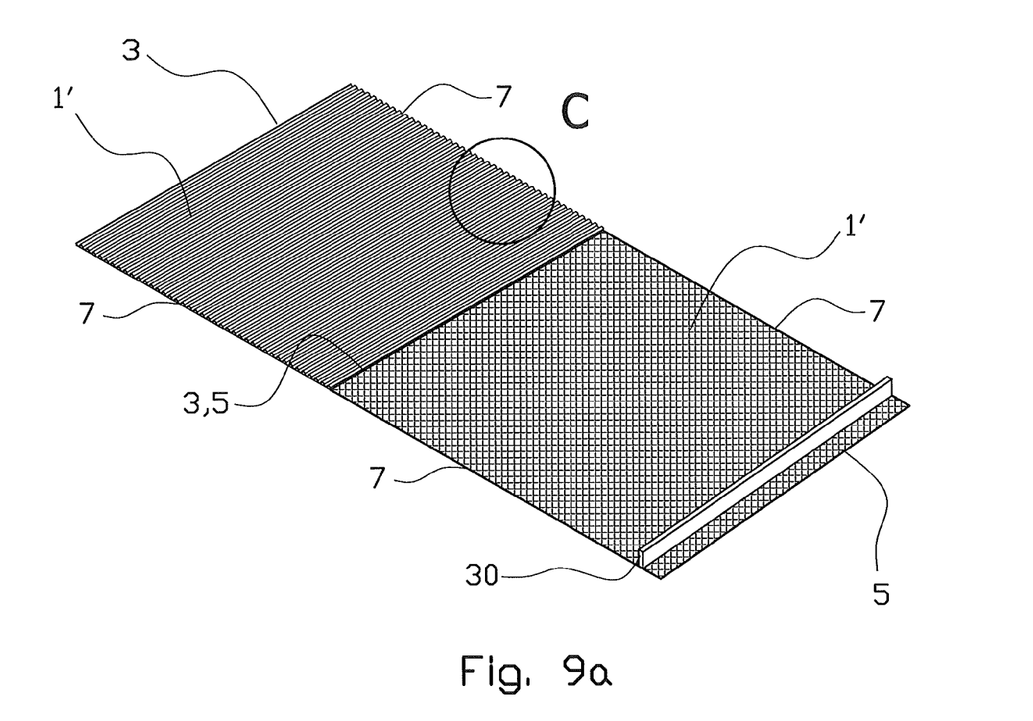
FIG. 9a shows, in perspective, a front elevation of two sheets of sieve cloth joined together, and wherein one of the sheets has a waveform.

In FIG. 8a, three sieve cloth sheets 1' arranged in series are shown. In the embodiment shown, each of the sieve cloth sheets 1' has a filtering characteristic being dissimilar to the filtering characteristic of the two other sieve cloth sheets 1'.

The end portions 3, 5 of each of the sieve cloth sheets 1' extend in an arch form between the side portions 7 of the sieve cloth sheets 1'.

Figure 8B:
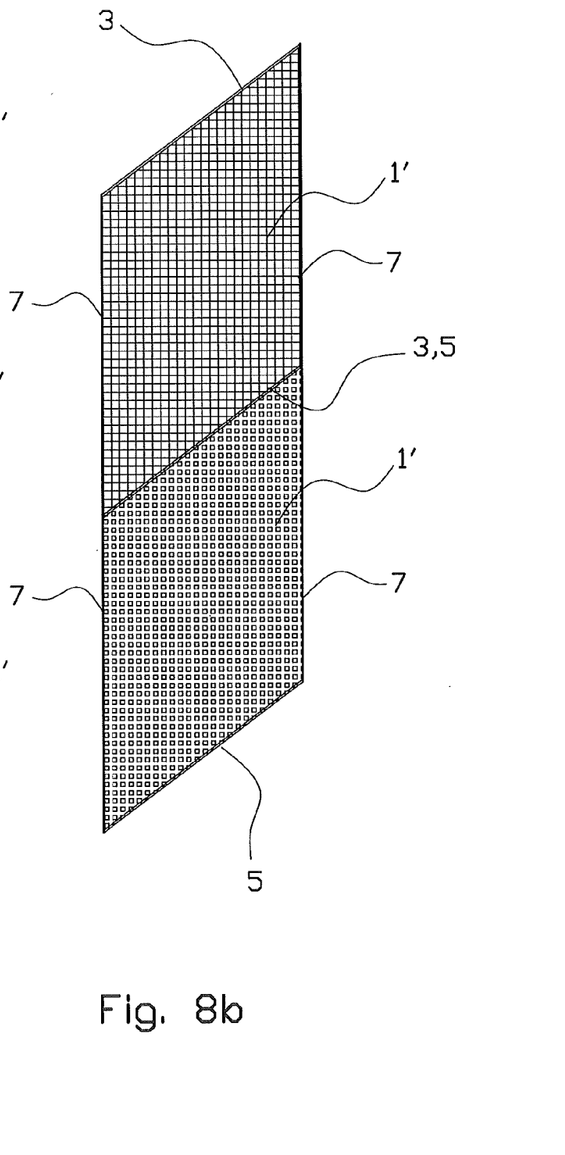

In FIG. 8b, two sieve cloth sheets 1' arranged in series are shown. The two sieve cloth sheets 1' are shown as two sieve cloth sheets 1' having dissimilar filtering characteristics. The end portions, hence the cloth attachment means 3, 5 of each of the sieve cloth sheets 1', extend slantingly between the side portions 7 of the sieve cloth sheets 1', i.e. at an angle different from 90° to the side portions 7 of the sieve cloth 1.

The purpose of arranging the end portions 3, 5 with an arch form and aslant, as shown in FIGS. 8a and 8b, respectively, is to prevent the joint of the end portions 3, 5 from being passed simultaneously over the transverse elements 15 of the support belt 12 (see FIG. 5). Tests have shown that if the transverse elements 15 exhibit a protrusion or a depression relative to the rest of the support belt 12, the transverse elements 15 may produce a certain resistance to relative movement between the sieve cloth 1 and the support belt 12. Such a resistance may cause said relative movement to become "jagged", simultaneously allowing it to produce an undesirable load on the joint between two end portions 3, 5. Upon disposing the joint at an angle relative to the transverse elements 15 of the support belt, passing the joint simultaneously over all of the transverse elements 15 is avoided, whereby a "soft" relative movement is achieved.

Figure 9B:
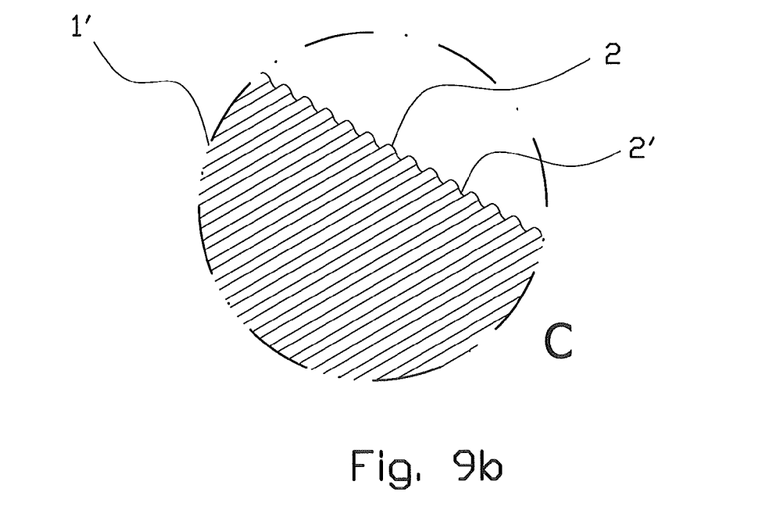

FIG. 9a shows, in perspective, a front elevation of two sieve cloth sheets 1' arranged in series. The uppermost thereof is comprised of a waveformed sieve cloth sheet 1'. The waveform appears more clearly in FIG. 9b, wherein detail C of FIG. 9a is shown in larger scale.

The purpose of a waveformed sieve cloth is, among other things, to be able to increase the collective area of the filtering surface. Moreover, a waveform having ridges 2 and depressions 2' will provide a resistance to flow excursions, transverse to the waves, of material being supplied to the sieve cloth. Thus, a sieve cloth having a waveform may also function as a form of flow rectifier, insofar as the supplied material will flow more readily within the depressions 2' than across the ridges 2.

Another advantage of providing a sieve cloth sheet 1' with a waveform, as shown, is that the sieve cloth sheet 1', when passed over the turning roller 14 (shown in e.g. FIG. 1), more stretching will be produced in the ridges 2 of the sieve cloth sheet 1' than in the depressions 2' thereof. In the embodiment of the sieve cloth sheet 1' shown at the top of FIG. 9a, the ridges 2 and the depressions 2' extend parallel to the turning rollers 14. The distance between two ridges 2 located side by side will increase when said ridges 2 pass the turning roller 14. Material located in the depression 2' between said two ridges 2 may thus be able to disengage more readily from the sieve cloth sheet 1' and fall off when the upper side of the sieve cloth sheet 1' is facing downwards upon having been passed over the turning roller 14, which is located downstream of a material supply portion in the sieve apparatus 10. If the ridges 2 and the depressions 2' extend parallel to the direction of movement of the sieve cloth sheet 1', the ridges 2 will be pulled down somewhat when the sieve cloth sheet 1' passes over the turning roller 14. Tests have shown that also this has a positive impact on the "cleaning" of the sieve cloth sheet 1'.

The first end portion 3 and the second end portion 5 of a sieve cloth sheet 1' are, as mentioned, provided with a first attachment means and a second attachment means, respectively. The attachment means may be fastening spots, or "ribbons" of the attachment means extending completely or partially along the end portions 3, 5.

Upon connecting an attachment means corresponding to the first attachment means to one of the side surfaces 7 of the sieve cloth sheet 1', and also connecting an attachment means corresponding to the second attachment means to the opposite side surface 7, the sieve cloth sheet 1' may be rotated 90° relative to the longitudinal direction of the sieve cloth 1. This, of course, presupposes that the sieve cloth sheet has a square shape, or that the end portions 3, 5 are provided in an elastic material. For example, the wave direction of the sieve cloth sheet 1' shown at the top of FIG. 9a may thus be changed from extending parallel to the turning rollers 14 to extending perpendicular to the turning rollers 14.

The end portions 3, 5 of the sieve cloth sheets 1' may be provided with a cloth attachment means at both the lower side and the upper side of the sieve cloth sheet 1'. By so doing, a sieve cloth sheet 1' may be formed as a multilayer sieve cloth sheet, wherein the layers are arranged in a sandwich structure. For example, the middle sieve cloth sheet 1' of FIG. 8a may be comprised of one layer of sieve cloth, whereas the lowermost sieve cloth sheet 1' of FIG. 8a may be comprised of a sieve cloth sheet 1' corresponding to the middle sheet, but having a further sieve cloth sheet 1' disposed on-top thereof.

As such, the filtering characteristic of the individual sieve cloth sheet 1' may be changed to a finer filtration, and/or the effective life properties of the individual sieve cloth sheet 1' may be changed without having to remove the sieve cloth sheet 1' bearing against the support belt 12.

In one embodiment, a sieve cloth sheet 1' having a first longitudinal extent is structured in a manner allowing it to receive, at the upper side thereof, a second sieve cloth sheet 1' having a second extent. In one variant, the second extent is less than the first extent. In another variant, the second extent is larger than the first extent.

In FIG. 9a, a dividing profile 30 protruding upwards from a portion of the lowermost of the two sieve cloth sheets 1' is shown. The main objective of the dividing profile 30 is to provide a flow restriction in order to reduce the flow of supplied material from one sieve cloth sheet 1' onto a subsequent sieve cloth sheet. The material being supplied may include a cleaning-promoting material, for example water, steam, air and/or a detergent or a solvent.

In the embodiment shown, said subsequent sieve cloth sheet may be a further sieve cloth sheet (not shown), or it may be the waveshaped sieve cloth sheet 1' upon having connected the first end portion 3 thereof together with the second end portion 5 of the lowermost sieve cloth sheet 1' by means of said first attachment means and second attachment means.

It should be appreciated that one or more dividing profiles 30 may be disposed at any location on any sieve cloth sheet 1', and at any angle relative to the direction of movement of the sieve cloth sheet 1', and at any extent. If the dividing profiles 30 extend non-parallel to the turning rollers 14, the dividing profiles 14 must be made of an elastic material capable of being passed around the turning rollers 14, or the dividing profile 30 must be provided as a series of individual elements.

The object of providing an endless sieve cloth 1 comprising at least two sieve cloth sheets 1', wherein at least two of the sieve cloth sheets 1' have dissimilar filtering characteristics, are as follows. Upon recovery of e.g. drilling mud, it is desirable for the mud to satisfy specific properties with respect to, among other things, specific gravity and a grading curve for the material fines being admitted through the sieve cloth. Upon monitoring the properties of the drilling mud recovered by means of the sieve apparatus 10, the distribution of e.g. the fines content in the drilling mud may be adjusted so as to optimize the sieving operation without having to remove the sieve cloth 1 from the sieve apparatus 10 in order to replace it with a new one having a different filtering characteristic. This is achieved by allowing the particular one of the sieve cloth sheets 1' having the desirable filtering properties, to receive the material to be sieved, and allowing this sieve cloth sheet 1' to undergo a back-and-forth motion, instead of allowing the endless sieve cloth to rotate in one direction only in the sieve apparatus 10. Optionally, the sieve cloth may be moved in one direction, but upon adjusting the velocity in accordance with the particular sieve cloth sheet 1' receiving the material, the sieving operation may be optimized.

Even though each of the sieve cloth sheets 1' shown in FIGS. 8*a*, 8*b* and 9*a* are depicted having dissimilar filtering characteristics, it should be appreciated that two, several or all of the sieve cloth sheets 1' may have the same filtering characteristic in an alternative embodiment. If damage occurs to one of the sieve cloth sheets 1', the object of such a solution is, among other things, to avoid having to replace the entire endless sieve cloth with a new one, but only to replace the sieve cloth sheet 1' being damaged.

The sieve cloth sheets 1' shown in FIGS. 8*a*, 8*b* and 9*a* may be attached to each other in order to provide one sieve cloth sheet prior to attaching the sheet to the support belt 12, as shown in FIG. 3. However, the joining of the sieve cloth sheets 1' may be carried out simultaneous with the introduction of the sieve cloth sheet 1' in the sieve apparatus 10. This is carried out by attaching a first sieve cloth sheet to the attachment means 16 of the support belt 12, moving it a distance into the sieve apparatus 10 by rotating the turning roller 14, and attaching the first end portion 3 of a second sieve cloth sheet to the second end portion 5 of the first sieve cloth sheet 1'. This is repeated, possibly with a further sieve cloth sheet, until an endless sieve cloth 1 may be provided, as explained and shown in FIG. 7.

In order to facilitate control of the apparatus, the support belt 12 is provided with a signal transmitter 20, as discussed earlier. Furthermore, one, several or all of the sieve cloth sheets 1' may be provided with a signal transmitter 19, as shown in FIG. 8*a*. The purpose of said signal transmitter 19 is to allow the driving device 22 to be controlled for rotation of the turning roller 14, and in such a manner that a desirable portion of the endless sieve cloth 1, for example a specific sieve cloth sheet 1', is brought to a stop when in a desirable position. Moreover, the signal transmitters 19 in each of the sieve cloth sheets 1' are used in context of controlling said optimization of the sieving operation.

The wear of the sieve cloth is affected by the velocity difference between the sieve cloth 1 and the support belt 12. Upon providing the support belt 12 and at least one of the at least one sieve cloth sheet 1' with a signal transmitter 19, 20, the velocity difference between the support belt 12 and the sieve cloth 1 may be measured. This, in turn, may be used to control the rotational velocity of the turning roller 14, whereby an optimum velocity difference is achieved.

In a preferred embodiment, the signal transmitter 19, 20 is a so-called RFID-chip and the receiver is an RFID-transceiver, both of which are based on well-known and thoroughly tested technology which will be known to a person skilled in the area and, hence, will not be discussed in further detail in this document. For example, the signal transmitter 19, 20 may be connected to a portion of the sieve cloth sheet 1' and the support belt 12, respectively, as discussed in applicant's Norwegian patent application 20110438.

While the invention has been described with a certain degree of particularity, many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. A method of connecting a sieve cloth (1) to a sieve apparatus (10) of a type wherein an endless sieve cloth (1) is supported by a support belt (12) which, in operation, is structured to rotate around at least two spaced-apart turning rollers (14), the method comprises the steps of:
    providing at least one sieve cloth sheet (1') having an upper side, a lower side, two side portions (7) and a first end portion (3) and a second end portion (5) extending between the side portions (7);
    bringing at least a portion of the sieve cloth sheet (1') into engagement with a portion of the support belt (12);
    positioning the sieve cloth sheet (1') against the support belt (12) by moving the support belt (12) around the turning rollers (14);
    bringing at least two adjoining end portions (3, 5) into engagement with each other until the at least one sieve cloth sheet (1') forms an endless sieve cloth (1); and
    releasing the sieve cloth (1) from said engagement with the support belt (12).

2. The method according to claim 1, wherein the step of releasing the sieve cloth (1) from engagement with the support belt (12) is an active step on behalf of an operator.

3. The method according to claim 1, wherein the step of releasing the sieve cloth (1) from engagement with the support belt (12) occurs in response to an engagement having a strength being less than a force arising between the support belt (12) and the endless sieve cloth (1) when both are set in motion around the turning rollers (14).

4. The method according to claim 1, wherein engagement between the sieve cloth (1) and the support belt (12) is provided by means of an attachment means (16, 16') releasably connected to a portion of the support belt (12).

5. The method according to claim 1, wherein the method further comprises connecting at least one signal transmitter (20) to a portion of the support belt (12); putting the at least one signal transmitter (20) into communication with a receiver (21) connected to a control system, wherein the control system is structured to control a driving device (22) providing rotation of the support belt (12), and in such a manner that the driving device (22) is brought to a stop when the signal transmitter (20) is located in a predetermined position in the sieve apparatus (10).

6. The method according to claim 5, wherein the at least one signal transmitter (20) is releasably connected to a portion of the support belt (12).

7. The method according to claim 1, wherein the method further comprises connecting at least one signal transmitter (19) to a portion of the sieve cloth (1); and putting the at least one signal transmitter (19) into communication with a receiver (21) connected to a control system, wherein the control system is structured to control a driving device (22) providing rotation of the support belt (12), and in such a manner that the interconnected end portions (3, 5) of the sieve cloth (1) are brought to a stop in a predetermined position in the sieve apparatus (10).

8. The method according to claim 1, wherein the at least one sieve cloth sheet (1') is provided by means of at least two sieve cloth sheets (1') arranged in series in the direction of movement of the sieve cloth (1).

9. The method according to claim 8, wherein at least two of the at least two sieve cloth sheets (1') are provided by sieve cloth sheets (1') having dissimilar filtering characteristics.

10. The method according to claim 9, wherein the method further comprises controlling the endless sieve cloth (1) by rotating the turning rollers (14) in such a manner that a desirable amount of solid particles and fluid is supplied to at least one, or is distributed between two or more, of the at least two sieve cloth sheets (1') having desirable filtering characteristics.

11. The method according to claim 10, wherein the method further comprises providing the sieve cloth sheets (1') with a signal transmitter (19) structured to communicate with a receiver (21) connected to a control system to control a driving device (22) for rotation of at least one of the turning rollers (14).

12. A sieve cloth (1) for operation in a sieve apparatus (10) to separate solid particles from a fluid, wherein the sieve apparatus (10) is provided with an endless sieve cloth (1) structured to be moved around two spaced-apart turning rollers (14), the sieve cloth (1) comprises:
   at least one sieve cloth sheet (1') having an upper side, a lower side, two side portions (7) and a first end portion (3) and a second end portion (5) extending between the side portions (7);
   end portions (3, 5) are provided with a first cloth attachment means (3) disposed at least in a portion of the first end portion (3), and a second cloth attachment means (5) disposed at least in a portion of the second end portion (5), and which fits in a complementary manner to the first cloth attachment means (3); and
   the sieve cloth sheet (1') being structured to provide an endless sieve cloth, at least one of the at least one sieve cloth sheet (1') is further provided with a releasable engagement means (4) structured to connect with an endless support belt (12) for the sieve cloth (1) or an attachment means (16) disposed in or on the endless support belt (12), the endless support belt (12) arranged for rotating around said at least two spaced-apart turning rollers (14) and wherein said engagement is structured to be brought to a stop before or during rotation of the sieve cloth in the sieve apparatus (1), and the sieve cloth (1) is moved at a different velocity than that of the support belt (12).

13. The sieve cloth according to claim 12, wherein at least the end portions (3, 5) of one of the at least one sieve cloth sheet (1') are provided with a cloth attachment means (3, 5) at both the lower side and the upper side of the sieve cloth sheet (1').

14. The sieve cloth according to claim 12, wherein the engagement means (4) is comprised of one of the first cloth attachment means (3) or the second cloth attachment means (5).

15. The sieve cloth according to claim 12, wherein the first cloth attachment means (3) and the second cloth attachment means (5) are chosen from a group consisting of a rope, a strip; a snap lock; hook and loop fasteners; one or more magnets; a series of push buttons; or any combination thereof; or an adhesive.

16. The sieve cloth according to claim 12, wherein the end portions (3, 5) of the at least one sieve cloth sheet (1') are disposed at an angle being different from 90° with respect to the side portions (7) of the sieve cloth sheet (1').

17. The sieve cloth according to claim 12, wherein the endless sieve cloth (1) comprises at least two sieve cloth sheets (1') arranged in series in the direction of movement of the sieve cloth (1).

18. The sieve cloth according to claim 17, wherein at least two of the at least two sieve cloth sheets (1') have dissimilar filtering characteristics.

19. The sieve cloth according to claim 12, wherein each of the at least one sieve cloth sheet (1') is further provided with at least one signal transmitter (19) structured to communicate with a receiver (21) connected to a control system, wherein the control system is structured to control a driving device (22) for rotation of at least one of the turning rollers (14), and in such a manner that the interconnected end portions (3, 5) of the sieve cloth (1) are brought to a stop in a predetermined position in the sieve apparatus (10).

20. The sieve cloth according to claim 12, wherein the attachment means is releasably connected to the support belt (12).

21. The sieve cloth according to claim 12, wherein the support belt (12) is provided with at least one signal transmitter (20) structured to communicate with a receiver (21) connected to a control system, wherein the control system is structured to control a driving device (22) for rotation of at least one of the turning rollers (14), and in such a manner that the support belt (12) is brought to a stop in a predetermined position in the sieve apparatus.

22. The sieve cloth according to claim 21, wherein the signal transmitter (20) is connected to the support belt (12) by means of a releasable attachment device.

23. The sieve cloth according to claim 22, wherein the second engagement means is connected to the releasable attachment device (16').

24. The sieve cloth according to claim 12, wherein at least one of the at least one sieve cloth sheet (1') is formed with a waveform, and having ridges (2) and depressions (2').

25. A drilling rig for use in context of drilling a well for recovery of petroleum, wherein the drilling rig includes a sieve apparatus (10) for cleaning drilling mud, wherein the sieve apparatus (10) includes the sieve cloth (1) according to any one of claims 12-24.

* * * * *